Dec. 19, 1961 M. E. CUPERY 3,013,904
SUBSTRATE HAVING AN ORGANIC POLYMER CONTAINING
PENTAVALENT PHOSPHORUS BONDED THERETO
Filed April 13, 1959

INVENTOR
MARTIN E. CUPERY

BY Fred C. Carlson
ATTORNEY

United States Patent Office 3,013,904
Patented Dec. 19, 1961

3,013,904
SUBSTRATE HAVING AN ORGANIC POLYMER CONTAINING PENTAVALENT PHOSPHORUS BONDED THERETO
Martin E. Cupery, Wilmington, Del., assignor to E. I. du Pont de Nemours and Company, Wilmington, Del., a corporation of Delaware
Filed Apr. 13, 1959, Ser. No. 805,699
5 Claims. (Cl. 117—76)

This invention concerns articles produced by applying coatings of phosphorus containing organic polymers over coatings of positively charged colloidal metal oxides applied to negatively charged substrates, and the articles thus produced.

Such application of anionic phosphorus containing organic polymers over base coatings of colloidal metal oxides greatly promotes and stabilizes the adherence of metal oxide particles to substrates without distracting seriously from the beneficial effects obtained from such metal oxide coatings. The result is that anionic phosphorus containing organic polymer topcoatings greatly enhances the desired properties of colloidal metal oxide coatings. Thus, for example, the combination treatment of an anionic organic polymer containing phosphorus as a topcoating over an alumina colloid base coating applied on textile fibers gives outstanding improvements in the resistance to soiling and in the washability of fabrics made from fibers so treated. Moreover, entirely novel and useful effects are obtained by applying to substrate surfaces alternating layers of metal oxide particles and organic polymers containing phosphorus. Those skilled in the art will appreciate the value of this invention.

Figure 1:
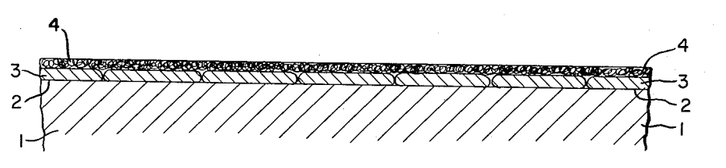

More particularly, this invention is directed to articles produced by processes whereby at least one anionic organic polymer containing pentavalent phosphorus is applied as a topcoating over at least one positively charged colloidal metal oxide applied to the surface of a solid substrate said substrate being negatively charged with respect to the colloidal metal oxide particles. The invention is directed to the coated articles thus produced which comprise the solid substrate, the colloidal metal oxide particles as a base coating, and the anionic organic polymer containing pentavalent phosphorus as a topcoating In the drawing there is illustrated in cross section an article of the invention in which there is a substrate 1 having a base coat 3 of positively charged fibrous boehmite alumina bonded to the substrate surface 2 which is negatively charged with respect to the alumina, the base coat bearing a topcoat 4 of an anionic organic polymer containing pentavalent phosphorus.

The invention will now be described in detail.

The substrates

In general, the solid substrate to be coated with colloidal metal oxide need have no special attributes. Physical characteristics such as density, porosity, surface-area, strength and the like and chemical characteristics such as composition, natural or synthetic origin, and the like, are, in general, not significant.

It is preferred, however, that the surface of the substrate to be coated with colloidal metal oxide be negatively charged with respect to the charge of colloidal metal oxide. This is because such colloidal particles of metal oxide, which are regarded as being positively charged, will tend of exhaust uniformly and substantively upon the surfaces of substrates negatively charged. Thus, negatively charged (with respect to the colloidal metal oxides) solid substrate surfaces can be effectively coated in mono or multiple particle layers by simply bringing substrate surfaces into intimate contact with dilute solutions of positively charged colloidal metal oxide.

Thus, when negatively charged surfaces are coated with solutions of colloidal metal oxides (the solutions actually being either sols or dispersions of the colloidal metal oxides) according to the present invention, several distinct types of monomolecular forces may be involved in bonding the fibrils or aggregates to those surfaces. Those bonds due to opposite polar charges are concerned with Van der Waals forces commonly having an energy of the order of 2,000 to 10,000 calories per mole. Chemical linkages through covalent bonds have an energy value from 10,000 to 200,000 calories per mole. Coordination bonding approximates covalent bonding in strength.

Generally, those base materials containing electronegative atoms are characterized by having substantial proportions, that is, above 5%, of an element or elements selected from the group consisting of oxygen, nitrogen, halogen and sulfur. These elements frequently are present in highly polar groups such as —OH, —NH$_2$, —COC—, —NH—, >C=O, —C≡N, —COOH, —SO$_3$H, and others. Such substrates have a negative ionic charge in water when the polar group is at least slightly acidic in nature such as —COOH, —SO$_3$H, —SH, Such base materials which may be satisfactorily coated with colloidal metal oxides for purposes of this invention include most of the principal industrially important organic and inorganic materials.

It is noted that those substrate materials which are not negatively charged with respect to the colloidal metal oxide particles, or which do not contain substantial proportions of highly polar groups like those above can nevertheless be adapted for use in the processes and products of this invention by either modifying their surfaces as by chemical incorporation of compounds which of themselves have substantial proportions of such highly charged polar groups, or by associating such materials with other materials which have negatively charged surfaces. Thus, polymers and copolymers during manufacturing processes or aging periods can partially oxidize or they can assimilate on or near their exposed surfaces certain compounds having free carboxylic, aldehyde, or other groups in sufficient amounts to impart negative characteristics to surfaces normally not highly negatively charged. Further, natural and synthetic fibers, resins, and broadly those polymers and copolymers containing substantial amounts of nitrogen, oxygen, halogen, sulfur and the like may be incorporated in fabrics, films, and other materials, thereby presenting negatively charged surfaces which bond with colloidal metal oxides. Additionally, the surface oxidation of some metals for example those containing silicon, leads to the formation of hydroxide or oxide films lending negative characteristics. This leads to the conclusion that the invention is generically applicable to the large majority of surfaces in general, and those surfaces which do not display negative characteristics may be modified so as to be negatively charged. The surfaces of many materials become negatively charged especially in water below pH 7.

Other polymers and copolymers may be modified by the inclusion of various negatively charged compounds, as is well known in the art. Various rubbers, synthetic and natural, may be further modified whereby their surfaces are markedly negatively charged. A good example of modified rubber is polyester rubbers and acrylonitrile-butadiene-type copolymers and others. Further, surface oxidation and flame treatments of these surfaces will impart increased negative characteristics.

A preferred substrate for use in the processes and products of this invention is synthetic fibers and textiles in general.

In particular, the following classes of substrates can be coated with colloidal metal oxides for use in the processes and products of this invention:

(1) Fibrous products including natural and synthetic fibers of organic or inorganic origin may be woven together so as to form a fabric and fabric-like material as well as the fibers themselves.

The term "fiber" includes both inorganic and organic and synthetic and naturally occurring fibers. The term "fiber" includes staple, yarn, filaments, card sliver, twisted continuous filaments, top, roping, roving, tow, stuffer box crimped tow, steam bulked tow, steam crimped continuous filament, two-component bulky continuous filament, yarn, spun yarns, and many others. It includes materials intended for use in fabrics in any stage of processing. The term "fiber" includes reinforcing fibers intended for plastic laminates, tire cord, and the like. The term "yarn" includes not only those yarns for textile usage, but also those for reinforcing other materials such as those yarns used in tire cord, rubber, felting, conveyor belting and the like. The term "fabric" includes materials which are woven, knitted, felted, fused or otherwise constructed from fibers; for example, the term "fabric" includes pile fabrics and paper fabrics.

Examples of natural fibers include cotton, flax (linen), hemp, jute, ramie, sisal, abaca, pharmium, silk wool, fur, hair of all types (such as goat and horse), animal bristles of all types (such as hog and camel), straw, asbestos and the like.

Synthetic fibrous materials which may be used as the substrate include those made up from polyamides, such as poly(hexamethylene adipamide), poly(hexamethylene sebacamide), polycaproamide, and copolyamides, polyesters and copolyesters such as condensation products of ethylene glycol with terephthalic acid, ethylene glycol with a 10/100 mixture of terephthalic/isophthalic acids, ethylene glycol with a 98/2 mixture of terephthalic/5-(sodium sulfo)-isophthalic acids, and trans-p-hexahydroxylene glycol with terephthalic acid, polyacrylonitrile, copolymers of acrylonitrile with other monomers such as vinyl acetate, vinyl chloride, methyl acrylate, vinyl pyridine, sodium styrene, sulfonate, terpolymers of acrylonitrile/methylacrylate/sodium styrene sulfonate made in accordance with U.S. Patent 2,837,501, vinyl and vinylidene polymers and copolymers, polycarbonates, polyurethanes, polyesteramides, polyethylenes, fluorinated ethylene polymers and copolymers (e.g. polytetrafluoroethylene), cellulose derivatives, such as cellulose acetate, cellulose triacetate, composite filaments such as, for example, a sheath and core as described in the copending application of Taylor, S.N. 640,722, filed February 18, 1957, now abandoned, regenerated cellulose, glass, and the like. Blends of two or more synthetic or natural fibers may be used as well as blends of synthetic and natural. The fibers and filaments may be crimped or uncrimped, drawn or undrawn and/or bulked or unbulked. Two or more synthetic fibers with or without natural fibers may be blended. Other synthetic fibers include, for example, "Dacron" (a Du Pont trademark) polyester fiber, "Orlon" (a Du Pont trademark) acrylic fiber; "Zefran" (a Dow trademark) acrylic fiber; "Dynel" (a Union Carbide trademark) acrylic fiber; linear polyamides including nylons "Teflon" (a Du Pont trademark) polytetrafluoroethylene, "Terylene" (a trademark of Imperial Chemical Industries) polyethylene terphthalate polymer, polyvinyl alcohol polymers, homopolymers, regular copolymers as well as graft copolymers, segmented elastomers etc. The term also includes materials produced from derivatives and regenerated forms of natural polymers such as rayons and proteinaceous fibers as "Ardil," "Vicara," and the like made from casein, peanut protein and so forth. Glass fibers are excellent fibrous substrates for the processes and products of this invention. In the case of substrates which are difficult to wet with water, it is necessary to modify the surface, by methods known to the art, to render the surface hydrophilic and at least wettable with aqueous dispersions of the colloidal oxide to be employed.

(2) Solid plastics and elastomers, and films thereof, by which is meant those products which are cast or molded.

Among examples of solid plastics, are resins like polymethylmethacrylate, such as "Lucite" (a Du Pont trademark); polyvinyl acetals, such as "Butacite" (a trademark of Du Pont); polyvinylalcohol; polyvinyl acetate; polyethylene such as "Alathon" (a Du Pont trademark) polypropylene; polyvinyl chloride; polyvinyl fluoride; polyvinylidene chloride; polystyrene; polytetrafluoroethylene; nylon resins such as "Zytel" nylon (a trademark of Du Pont); and the like.

Examples of elastomers include butadiene copolymers such as butadiene-styrene (GR-S types) and butadiene-acrylonitrile types, isobutyleneisoprene ("Butyl" rubber), polybutadiene, and polyisoprene; polychloroprene such as the neoprenes; fluorocarbon polymers, for example hexafluoroprene/vinylidene fluoride such as "Viton A" (a Du Pont trademark), polyisoprene, fluoroacrylic ester polymers, chlorosulfonated polyethyenes, such as "Hypalon" (a Du Pont trademark); polyurethanes; polyesters; polyester-amides; silicone-type elastomers; and the like.

The above plastics and elastomers may be used as solid masses formed by molding or casting, or as cast coatings on various substrates or as unsupported films.

Films which are particularly useful as substrates for fibrous boehmite topcoats in accordance with this invention are cellulosic films, such as regenerated cellulose, commonly known as cellophane; polyester films, such as "Cronar" (a Du Pont trademark) or "Mylar" (a Du Pont trademark), polyvinylidine chloride such as "Saran" (a Dow trademark), rubber hydrochloride and isomerized rubber.

(3) Paper and paperlike products, by which reference is had to substrates in a sheet or sheet-like form made from natural and synthetic fibers and prepared by conventional mat-forming procedures.

Such paper and paper-like products can be prepared in conventional ways from organic, inorganic, or mixed organic and inorganic natural or synthetic fibers. The fiber component can be of almost any form. Usually, however, such papers are made from cellulosic materials derived from wood pulp or cotton although other cellulosic materials can also be used. Papers may also be formed from inorganic fibers such as glass, silica, asbestos, alumino silicate fibers, and the like. Synthetic organic products which may be used in paper-like polymers include acrylic types, for example, "Orlon" (a Du Pont trademark) polyesters, such as "Dacron" (a Du Pont trademark) and nylons.

Note that wood itself can be coated in accordance with the invention.

(4) Naturally occurring organic products such as wood products like compressed wallboard, veneers, pressed chipboard, etc., leathers such as tanned hides or cured leathers, straw, coal, tobacco, growing plants (helps retain moisture on leaves).

(5) Ceramics, refractories and stone products, by which reference is had to all types of glass, both siliceous and non-siliceous; cement and mortar; structural clay products such as brick, tile, sewer pipe and clay refractories; pottery and related products such as vitreous plumbing fixtures, vitreous china food utensils, earthen ware food utensils, porcelain electrical supplies, pottery products; cement and plaster products such as concrete and gypsum products, lime and mineral wool; cut stone and stone products; abrasive products such as silicon carbide, aluminum oxide, diamond, emery, silica, garnet, tripoli; asbestos products, such as asbestos-cement shingles and pipe, millboard, fabrics, insulation, brake linings, gaskets, non-clay refractories such as alumina, zirconia, silica, magnesite, mullite, chromite, and graphite.

(6) Metals of all kinds as well as alloys of these elements. Included are ferrous metals and alloys such as carbon steel, alloy steel, stainless steel, gray iron castings, malleable steel castings; copper and its alloys such as brasses and bronzes; aluminum, magnesium, lead, zinc, tin, cobalt, titanium, molybdenum and their alloys. The fibrous boehmite coatings can be put on the metal early in the manufacturing process, e.g. on the rig, bloom, billet, slab, bar, skelp, tube round; on semi-finished shapes such as sheets, wire, strip, black plate, tin plate, terne plate or on the finished fabricated metal article.

(7) Paints and finishes of all types. Included are conventional organic vehicle-based paints or finishes using alkyl or drying oil modified alkyd resins, melamine-formaldehyde, ureaformaldehyde, or phenol-formaldehyde resins, polyacrylic ester resins, as well as paints using bodied and resin reinforced drying oils such as linseed oil, soya bean oil, and China-wood oil. Also included are lacquers, such as nitrocellulose types.

Colloidal metal oxides

The colloidal metal oxides useful in the processes and products of this invention must be positively charged and have average particle sizes of less than about 1 micron in their largest average dimension.

The particles can be of irregular, spherical, fibrous or other shape. Preferably, the average smallest dimension of such colloidal particles should be less than 100 millimicrons. Also, preferably such colloidal particles should have a specific surface area greater than 100 m.$^2$/g., although the particles broadly can have specific surface areas greater than 25 m.$^2$/g. (as by nitrogen adsorption). When oxide particles are larger than about 100 millimicrons or have a specific surface smaller than 25 m.$^2$/g., they show less substantivity and bonding to the surface of solid substrates. However, if very few smaller particles are present, colloidal particles having a specific surface as small as 10 m.$^2$/g. may be used with some success in this system.

The positively charged metal oxides useful in this invention are non-dialyzable, that is, they do not pass through a cellophane or sausage casing membrane from aqueous medium. Metal oxide compounds which pass through such a casing are not in colloidal form but in true solution and are not to be classed with the metal oxides useful in the processes and products of this invention.

To determine whether an aluminum compound is dialyzable, one places 100 cubic centimeters of a 1% solution or dispersion of the aluminum compound in water in cellophane sausage casing. These uncoated cellophane sausage casings are sold by the Fisher Scientific Company, Philadephia, Pennsylvania, as seamless cellulose dialyzer tubing ¾ of an inch in diameter and have a wall thickness of 0.00072 inch. This filled casing, tied off at each end, is suspended in 4 liters of distilled water and agitated continuously for four days at 25 to 30° C. Metal oxides do not pass through this cellophane membrane but soluble metal salts do so. Therefore, the amount of metal oxide remaining in the cellophane sausage casing corresponds to the total non-dialyzable metal oxide present in the original sample. However, since there is an equilibrium condition of soluble metal salts between the inside and the outside of the cellophane membrane, there will be in all cases one four-hundredth (¹⁄₄₀₀) of the soluble or dialyzable metal oxides remaining within the cellophane bag, and this amount should be subtracted from the metal oxide remaining in the bag in order to correct for the small amount of soluble metal oxide remaining there in equilibrium. Certain metal salts which are originally dialyzable form some colloidal metal oxide on long standing in dilute aqueous solution, especially if partly neutralized with base. Certain poorly defined, so-called basic aluminum salts in aqueous solution contain a fraction of the above method. It is generally preferred to use solutions or dispersions where at least 5% of the metal oxide is in colloidal form and more preferably at least about 50% in the colloidal form.

Many commercial metal oxides are rather heterogeneous as to their particle sizes and contain particles which are larger than colloidal size but this does not exclude their applicability for use in processes and products of this invention.

Generally, a certain fraction of heterogeneous metal oxide is of sufficiently small particle size to form coatings on the fibers used as substrates in this invention. Ordinarily, it is most desirable to use particles which are small and are of colloidal dimensions (i.e. less than 400 millimicrons) because those of supercolloidal size tend to become trapped in the fiber or fabric and will whiten it to an undesirable degree.

By the term "positively charged" is meant that the positive charge of colloidal particles useful in this invention is such that when these oxides are in aqueous suspension the charge on the particles is such that they will move to the negative electrode when subjected to a direct current voltage in an electrophoresis apparatus. This positive charge is most apparent when the aqueous suspension has a pH between 1 and 6 adjusted with HCl.

The colloidal metal oxides which are positively charged include the oxides of metals such as aluminum, zirconium, titanium, chromium, iron and tin. Of these, the preferred metal oxides are those made of alumina, zirconia or titania, since these oxides produce colorless coatings, particularly when applied to textile fibers.

Such positively charged colloidal metal oxides can be produced by conventional methods. See, for example, the procedures described in the book by H. B. Weiser, vol. II, pages 105–113, published by John Wiley and Sons, Inc., New York, New York, 1935.

Alternatively, colloidal titanium oxide suitable for use in the processes and products of this invention can be made as described in British Patents Nos. 247,296; and 275,692. See also U.S. Reissue Patent No. 16,956.

Similarly, colloidal zirconia suitable for use in the processes and products of this invention can be made according to the teachings of German Patents Nos. 886,-446; 877,891; 928,728; and French Patent No. 1,094,146.

Also, colloidal tin oxides suitable for use in this invention are made according to the processes described in Weiser Inorganic Chemistry, vol. II, at pages 240–242.

Colloidal aluminas appear to be particularly effective for use in the products and processes of this invention. Many colloidal aluminas are available commercially. An alumina sold by Godfrey L. Cabot and Co. called "Alon C" (a trademark) can be dispersed in water to give colloidal alumina aqueous dispersions.

Another class of colloidal aluminas are the alpha aluminas, such as those sold commercially by the Aluminum Company of America as Grades A–1 and A–3, which have surfaces areas ranging from about 20 to 70 square meters per gram. They can be produced by the processes disclosed in U.S. Patent No. 2,642,337. The product called "laminar alumina" sold by Monsanto Chemical Company comprises plate-like particles of colloidal alumina and is a mixture of alpha and chi alumina.

The colloidal alumina called "Alon C" above referred to is a gamma alumina which can be produced by the burning of aluminum salts such as aluminum chloride and is in the form of almost spherical particles which contain a small amount of residual anions such as chloride. Such materials can be made by processes described in one or more of the following patents: German 902,-731/54, German 830,786, German 877,891, U.S. 2,780,525, and British 707,389/54.

Gibbsite colloidal aluminas can be made by, for example, the processes of U.S. Patent No. 2,549,549. Such a product is sold commercially by the Aluminum Company of America under the trade designations C-730.

Various amorphous alumina gels are also useful in the processes and products of this invention. Such gels can very often be peptized with or without some heating to alumina dispersions. Alumina gels can be made from a variety of starting materials as indicated by the following references: U.S. No. 2,154,603, U.S. No. 1,958,-710, U.S. No. 2,137,683, U.S. No. 2,657,115, U.S. No. 2,194,218, U.S. No. 2,656,321, U.S. No. 2,503,168, U.S. No. 2,453,847. There are a variety of alumina gels commercially available suitable for use in this invention. For example, those produced by the Reheis Company and sold as gels F-500 and F-1000.

An especially preferred colloidal alumina for use in the processes of the present invention is a fibrous boehmite in the form of fibrils having an average length of from 25 to 1500 millimicrons, the remaining average dimensions being in the range from 3 to 10 millimicrons. Such product has a surface area of from 200 to 400 square meters per gram. It is described in U.S. pending application Ser. No. 783,602, filed December 29, 1958, now Patent No. 2,915,475.

Boehmite alumina in the form of platelets can be used in this invention; see U.S. application Serial No. 668,681, filed June 28, 1957.

Organic polymer containing phosphorus

The organic polymers which are effective in this invention contain the element phosphorus. Such phosphorus is in the pentavalent state.

More specifically, such organic polymers containing pentavalent phosphorus are organic polymers containing a plurality of recurring lateral acidic groups containing pentavalent phosphorus, such lateral acidic groups being attached either directly or through intervening lateral structures to the polymer molecule.

Any acidic group containing phosphorus in the pentavalent state has been found to have a strong affinity for positively charged colloidal metal oxide particles, as described herein. Thus, the acidic group can be characterized by the formula:

where X is selected from the class consisting of where one or more of the $R_1$, $R_2$ or $R_3$ groups are attached to the polymer chain or form a part of the polymer chain, and the residual R groups are hydrogen or organic groups containing one to four carbon atoms, and Y is selected from the class consisting of —R, H, OH, $NH_2$ and OR in which R is an organic radical of one to eight carbon atoms.

The terms "polymer" and "organic radical" are used in their usual and conventional meanings. Thus, "polymer" has reference to a molecule formed from one, two or more classes of smaller molecules, each molecule of each class having the same percentage chemical composition, and "organic radical" has reference to a radical which, while it may confer characteristic properties on a polymer containing it, remains unchanged during in out the processes of this invention.

Thus, for example the phosphorus in the organic polymers can be present as phosphate, i.e., phosphinate, i.e.

phosphonate, i.e.

and phosphite, i.e.

where $R_1$, $R_2$ or $R_3$ may be H, or an organic group, at least one such group being organic and attached directly or by intervening atoms to the polymeric chain; and R′ is an organic grouping of less than 4 carbon atoms.

Although not included in the foregoing formula, organic polymers containing fluophosphoric and amidophosphoric acid groupings would also be operative in the processes and products of this invention. Note that this formula does not include "polyphosphates" and "polymeric phosphates" which terms generally refer to inorganic products.

Organic polymers containing only one pentavalent phosphorus atom per polymer molecule are generally uneffective in many respects for use in the processes and products of this invention. Such polymers, compared with those containing two or more pentavalent phosphorus atoms per polymer molecule, do not produce the outstanding desired properties and effects of the more preferred embodiments of the invention.

A plurality of recurring pentavalent phosphorus containing groups (i.e. two or more) should be present in the polymer chain of the organic phosphorus containing polymer in order to afford a maximum substantivity and adhesion of such organic polymers to the colloidal metal oxide coated substrate surface.

In general, the more useful processes and products of this invention employ organic polymers containing pentavalent phosphorus having average molecular weight of at least about 500 and preferably over about 1000. No critical upper limit for the weight of such organic polymer is known but usually the weight will not exceed from about 100,000 to 500,000.

As a practical matter, it is necessary for the organic polymer containing pentavalent phosphorus to be soluble in some solvent either aqueous or non-aqueous in nature. This follows because the polymer is applied from solution to a substrate coated with the colloidal positively charged metal oxide. Simply for reasons of economy and convenience in carrying out the processes of the invention, it is desirable but not necessary that the phosphorus containing organic polymer be soluble in aqueous solution.

Hence, while the free acid polymers are somewhat soluble in water, the neutral salts of the acid polymers are generally more soluble, and so are preferred for use in carrying out the invention. Typical common neutral salts are the ammonium and sodium salts of the organic phosphorus containing polymer.

Those skilled in the art will appreciate that non-aqueous solvents can be used and may even be preferred solvents for many uses. Thus, alcohols, hydrocarbons and other organic solvents can readily be used as vehicles from which the organic polymer containing pentavalent phosphorus is applied to the metal oxide coated substrates. Naturally, one would prefer to use a carrier for the phosphorus containing polymers which is non-reactive under the conditions employed in carrying out the processes of the invention.

Usually, organic polymers containing pentavalent phosphorus are derivatives of polymerized vinyl monomers or copolymerized combinations of different vinyl monomers. Examples of organic polymers containing pentavalent phosphorus which are particularly effective in this invention are those derived from the reaction of phosphoric acid with polymers containing lateral apoxide groups, for example, of the type described in U.S. Patents Nos. 2,692,876; 2,723,971 and 2,541,027. This general class of organic polymer phosphates includes those derived from copolymers of vinyl acetates and allyl glycidyl ether described in U.S. Patent No. 2,788,339 and are especially preferred for use in the processes and products of this invention because they are readily produced and are highly soluble in aqueous solution as the ammonium and as the alkali metal salts.

Examples of other types of organic polymer phosphates which can be used in the processes and products of this invention are products obtained by the reaction of phosphoric acid, phosphorus pentoxide, or phosphorus halides with polymer structures having a plurality of hydroxyl groups attached to the polymer chain, or polymers which contain hydroxyl groups as part of the lateral groups attached to the main polymer chain. Specific examples of such organic polymer phosphates are the phosphated derivatives of polyvinyl alcohols and the cellulosic materials such as polymerized sugars, dextrins, starches, and degraded cellulose.

Another class of organic polymers containing pentavalent phosphorus which may be adsorbed upon metal oxide coatings in accordance with the teachings of this invention are the water-soluble products derived from the reaction of hydrocarbon polymers with phosphorus trichloride and oxygen using the general procedure described in the J. Am. Chem. Soc., vol. 70, beginning at page 3880 (1948), and in vol. 71, beginning at page 2384 (1949).

Still another class of phosphorus containing polymers suitable for adsorption on metal oxide coatings in accordance with the teachings of this invention are the water-soluble polymer salts of the polyalkylene phenyl polyphosphinic acids prepared as described in Example 1 of U.S. Patent 2,829,137.

Of all the organic polymers containing pentavalent phosphorus, those which have been found to be the most useful in the processes and products of this invention are those of a phosphate ester type which have a hydroxyl group attached to the carbon atom which is located adjacent to that carbon atom attached to the phosphate ester structure. This general structure is represented by the formula:

where R and R′ are both a part of the organic polymer chain, or either R group is attached as part of a lateral group to the polymer chain and the other R group is hydrogen or an organic group such as an alkyl radical.

One theory as to why the structure defined by the formula above has these outstanding properties is that the adjacent hydroxyl group in some way becomes associated with the phosphate ester group, thereby stabilizing the ester structure under both acidic and alkaline conditions. But whatever may be the theoretical explanation, organic polymer phosphates containing this type of structure have outstanding resistance to hydrolysis in aqueous systems under both acidic or alkaline conditions. For example, in contrast to polymers containing carboxyl groups, the phosphate organic polymers, adhere tenaciously to metal oxide coatings in either acidic or alkaline solutions.

In general, the organic polymers containing pentavalent phosphorus which are useful in the processes and products of this invention contain at least about 0.5 weight percent of pentavalent phosphorus per molecule.

By the term "anionic" is meant that the acidic groups containing phosphorus in the polymer chain are in such a form that when placed in water they yield negative ions or anions. This limitation is made to exclude polymers containing fully esterified pentavalent phosphorus containing acidic groups for example the alkyl esters of polyphosphonic acids or other polymeric acids of phosphoric or phosphonic substituted polymers. Such esters can, of course, be hydrolyzed to the acids or acid salts and then used in the processes and products of the invention. The organic polymer containing acidic groups bearing pentavalent phosphorus which are useful in the invention are anionic and are peculiarly attracted to the colloidal metal oxide coated substrates.

*Methods of coating with oxide and phosphorus containing polymer*

In general, by the processes of this invention, positively charged colloidal metal oxides are first applied to the substrates and then the organic polymer containing pentavalent phosphorus is applied thereupon.

The positively charged colloidal metal oxides can be applied to substrates either as dry powders or as dispersions or sols in a suitable carrier such as water.

Aqueous dispersions of positively charged colloidal metal oxides can be stabled with acids or other agents as the art well knows and appreciates. See, for example, the above-identified H. B. Weiser book, vol. II, pages 106 through 111, inclusive. The concentration of colloidal metal oxides in such dispersions can vary widely. Concentrations of less than 0.1 weight percent in dispersions or sols can be used, especially since the colloid is substantive to the negative surface through which it is exposed and will exhaust thereon until the solution is essentially depleted of the colloid. Usually, however, the maximum concentration of colloidal metal oxide in dispersion or sol will not be above about 5 weight percent, although, depending upon the particular metal oxide and carrier used, concentrations of considerably higher than this amount can be obtained and used conveniently in the processes of this invention.

Contacting the negatively charged surface of a substrate to be treated with a positively charged colloid in accordance with the teachings of the invention is conveniently done by immersing the substrate in an aquasol or aqueous dispersion of the positively charged colloidal metal oxide or by simply painting such dispersion upon the surface of the substrate in any conventional manner. The so coated article may then be conveniently rinsed with water to remove any excess aquasol or other liquid present. Those skilled in the art, of course, will appreciate that for certain uses one might prefer to apply the positively charged colloidal metal oxides from dispersions of such oxides in an organic liquid carrier by the procedures well known and appreciated in the art.

In an alternative procedure of applying the colloidal metal oxides to the substrates, a dry surface of the substrate is exposed to the dry powder of the positively charged colloidal metal oxide and the excess powder is then removed by shaking, blowing with air, or rinsing with water. The actual exposure can be by any procedure. Merely sprinkling the dry powder over the surface of the substrate is often entirely adequate.

The precise technique of coating a substrate surface with colloidal metal oxide will, of course, vary with the particular type of substrate and surface being coated and it is not possible to give a precise set of instructions which will be useful in all situations. In any case, the coating of metal oxide on the negatively charged substrate surface is not removable by repeated rinsing in water.

Next, the metal oxide coated substrate surface is contacted with a solution of the organic polymer containing pentavalent phosphorus. Such contacting is done conveniently by dipping the coated article into an aqueous solution containing about 0.1 to 5 weight percent of a salt of the organic phosphorus containing polymer. Such aqueous polymer solutions can contain wetting agents to aid in surface coverage of the solution.

The organic polymer containing the pentavalent phosphorus is absorbed immediately and substantively onto the metal oxide coating. The article, thus treated, is then conveniently rinsed thoroughly with water to remove excess polymer solution. The organic polymer containing pentavalent phosphorus can be applied, of course, from organic solvents if desired. However, aqueous solutions are more economical in most cases.

If multiple coatings are desired, the article being treated can again be coated with a metal oxide colloid, followed by rinsing and the application of an additional coating of an organic polymer containing pentavalent phosphorus.

The polymer coating adhering to the metal oxide coating upon the substrate is insoluble and not removable by repeated rinsings in water or various organic solvents.

A preferable procedure following application of the organic polymer is to dry the coated article at elevated temperatures of, say, about 60° to 200° C., especially after a final polymer application and rinsings, in order to facilitate the drying and to increase the fastness and permanence of the treatment on the particular substrate used. However, the drying temperature employed must be such, of course, as will not damage the substrate used, such as a heat-sensitive fiber.

Mixtures of compatible, positively charged colloidal metal oxides can be used in the processes and products of this invention if desired. Such mixtures, as well as the individual positively charged colloidal metal oxides have optimum stability and show maximum adsorption on various substrates within certain ranges of solution acidity (pH values). In general, optimum colloid stability is obtained with pH ranges of from 1 to 7 and the maximum substantiveness of positively charged metal oxide colloids for negatively charged surfaces is obtained with pH values of about 3 to 8. A pH as high as 8 can be used with dilute sols. The specific requirements and optimum ranges for each composition can be easily determined experimentally, as illustrated in the examples.

The amounts of metal oxide in an organic phosphorus containing polymer which are applied to a substrate are controlled to a large extent by the concentrations of the treating (dipping) baths of these agents and by the application of single or multiple coatings. In general, textile fibers, for example, require only single applications of these respective agents to reduce the desired improvements in washability and other characteristics. However, multiple applications of these agents on paper pulp and leather are often desirable to obtain satisfactory water-repellancy, improved dyeability, greater ease of cleaning, and superior bulk and texture characteristics.

As can readily be appreciated, the respective quantity of colloidal metal oxide and organic polymer containing phosphorus to be used in the processes and products of the invention can vary greatly, depending upon a number of variables. In general, application within a range of from about 0.1 percent to 5 weight percent of both the metal oxide and organic polymer based on the weight of substrate produce satisfactory results although it will be appreciated that the size of the substrate, its density and the like can cause considerable variation in the actual weight of combined topcoat which will be applied thereto. Ordinarily, the thickness of the combined colloidal oxide and polymer layers upon a given substrate will be less than 100 millimicrons but it must be remembered that the actual combined thickness depends upon a number of difficultly definable variables such as the size of the particles being used, the size of the polymer molecule, etc. In some cases the combined layer may be as much as 1500 millimicrons or even much thicker.

Where bodying and bulking effects are desired, for example, as in paper or leather treatments, larger amounts of both respective coating agents can be employed. Over substrates such as metals and woods, for example, the percentage weight increase can be exceedingly low, since only a surface treatment of less than about 1 micron total thickness may be involved.

*Product characteristics*

A wide variety of products can be produced by the processes of this invention depending chiefly upon the particular effects desired. The examples following illustrate a few of the specific though characteristic advantages of this invention.

In general, the products of the invention are of two general types. If the organic polymer topcoat is applied as a sort of protective coating over the colloidal metal oxide basecoat in order to, say, preserve and enhance the properties of the basecoat then the thickness of the topcoat can range from about, say, 10% or even less to 500% or greater than the weight of colloidal metal oxide used as a basecoat.

On the other hand if the organic polymer topcoat is applied for its own properties using the colloidal metal oxide basecoat as a sort of bonding aid between substrate and topcoat, then the topcoat will tend to be a very great deal thicker perhaps amounting to 10 times or more than the weight of the original basecoat.

Thus, the amount and/or thickness of topcoat polymer used can not be stated with definiteness since the amount used in any given situation is subject to so many variables.

The amount of topcoat which will actually be adsorbed upon the colloidal metal basecoat and not merely coated thereon varies greatly depending upon the types of basecoat and topcoat involved. In general, high molecular weight, colloidal types of polymer topcoats show greater adsorption on a weight basis than do low molecular weight non-colloidal types of polymer topcoats. In the former case, adsorption by weight may be as high as several fold the weight of colloidal metal oxide basecoat.

Dispersible polymer topcoats, especially soluble ones (depending upon weight and colloidal weight), tend to adsorb on the colloidal metal oxide basecoat more readily than non-dispersible polymers. Highly acidic low molecular weight polymers show adsorption in the lower ranges while highly molecular weight polymers having smaller proportion acidic groups (say, one acidic group per 200 carbon atoms per polymer chain) show higher adsorption on a weight basis.

The quantity of colloidal metal oxide applied to a substrate varies greatly. Irregularly shaped oxide particles tend to contact substrate surfaces along their largest face but this is not always the case. In general, one desires to use sufficient colloidal metal oxide to give substantially complete surface coverage of the substrate surface using a single layer or monolayer of colloidal metal oxide particles which layer need not be uniform. Thus, the quantity of colloidal metal oxide used tends to lie in the range of a fraction of a millimicron to about one micron. Of course, if multiple layered coatings of colloidal metal oxides are used as basecoats then basecoat thickness of up to several microns can be employed. In general, the amount of colloidal metal oxide which can be economically adsorbed upon a substrate surface, however, will seldom exceed an amount in excess of that necessary to make a monolayer of colloidal metal oxide particles upon a substrate surface.

The application of organic anionic polymer topcoat containing pentavalent phosphorus over a colloidal positively charged metal oxide basecoat on a synthetic textile fiber substrate such as an acrylic fiber like "Orlon" (a Du Pont trademark), or a polyester fiber like "Dacron" (a Du Pont trademark) minimizes calcium ion adsorption and greatly enhances the washability and decreases the pilling action and soiling tendencies of fabrics made from such fibers. Calcium ions are often in hard water and the tendency to adsorb such metal ions, increases the adsorption of soaps and greasy soils so that fabrics become difficult to wash cleanly and readily become soiled there-after under ordinary conditions of service. However, the organic polymer phosphate coating greatly reduces this tendency to adsorb metal ions.

The very strong bond which forms between colloidal metal oxide particles and anionic phosphorus containing organic polymers enables one to prepare a number of new products which heretofore could not be made either because the beneficial properties of metal oxide coatings could not be realized as a practical matter because such oxide coatings could not be made to adhere in a durable manner to substrate surfaces or because the anionic phosphorus containing polymers could not be coated satisfactorily upon substrate coatings. Other advantages from practicing this invention on fiber substrates includes improvements in dye adsorption and in instances to static electric charge build-up. Still other advantages for different types of substrates are illustrated below.

The invention is further illustrated by the following examples:

A. A basic aluminum chloride solution with a mol ratio of $Al_2O_3:Cl$ of 1:1 was prepared from aluminum metal and aluminum chloride. The preparation was carried out in a 12-liter, 3-neck round bottom flask fitted with a reflux condenser, thermometer, agitator, and heating mantle. Four thousand grams of distilled water was added in the flask. In this distilled water 965.76 grams (four moles) of aluminum chloride hexahydrate was dissolved. To this aluminum chloride solution was added, with agitation, 539.4 grams (20 moles) of ether extracted aluminum metal dust, over a period of about 10 hours and at a temperature ranging from about 75° C. to about 95° C. The final basic aluminum chloride solution was very slightly opalescent and had a pH of 3.5. Chemical analysis of this solution showed that it contained 22.80% $Al_2O_3$ and 7.59% chloride (by weight) which corresponds to an $Al_2O_3:Cl$ ratio of 1:1. The value of $\theta$ was under one minute.

This concentrated basic aluminum chloride solution was diluted to a concentration of about 2% $Al_2O_3$. This solution was then autoclaved at 160° C. for one hour. The resulting product was a stable, opalescent sol which showed intense streaming birefringence between crossed polaroids and had a pH of 3.78. Chemical analysis of this product shows it contained 2.14% $Al_2O_3$, 0.65% Cl which corresponds to an $Al_2O_3:Cl$ mol ratio of 1.14:1. The amount of amorphous alumina present in this sol is determined by methods described above as 26.0% by weight. An electron micrograph at a magnification of 50,000 diameters showed that the sol contained fibrous boehmite alumina.

The specific surface area of the fibrous boehmite in the sol was 382 m.$^2$/g. as determined by nitrogen adsorption.

The sol obtained by autoclaving was deionized with an anion-exchange resin in the bicarbonate from, the resin being the bicarbonate form of a quaternary ammonium ion-exchange resin, "Nalcite SAR." The sol was deionized from a pH of 3.78 to a pH of 5.51 using 445 grams of wet, drained anion-exchanger.

Chemical analysis showed that the sol contained 1.85% $Al_2O_3$ and 0.06% Cl, by weight. This corresponds to a mol ratio $Al_2O_3:Cl$ of 11:1. As determined by X-ray analysis only boehmite alumina was present. The sol was stable and slightly opalescent. The specific surface area of the alumina in the sol, determined by nitrogen adsorption, was found to be slightly less than 400 m.$^2$/g. This method of preparation may be found on pages 153 and 154 of application Serial No. 594,265, now abandoned.

Similar sols of different particle size, specific surface and fiber dimensions may be made by varying the process conditions as described further in U.S. application Serial No. 783,602, filed December 29, 1958.

The invention is further illustrated by the following examples.

*Example I.*—A glass window was washed with an aqueous dispersion containing 0.5% colloidal alumina prepared as described in (A) above and the surface then rinsed thoroughly with warm water. There was no visible change in the appearance of the surface which, after air drying, remained hydrophilic in character. To the surface was then applied a solution containing 1% of a phosphate polymer ammonium salt prepared by the method of Example XIV of U.S. 2,273,971, and the surface again rinsed with warm water to wash off residual polymer solution. The surface had now acquired a strongly hydrophobic character, so that the water on the glass plate surface drained rapidly and completely, leaving no water spots. Thus the washed window dried almost instantly. There was no visible change in the clarity and appearance of the glass surface. Without prior application of an alumina coating, the application of the polymer phosphate solution did not produce a hydrophobic surface. The hydrophobic character of the polymer phosphate coating over the alumina was not removable by rinsings with organic solvents such as ethers, ketones, alcohols, and hydrocarbons, or by exposing the surface to aqueous acidic and alkaline solutions. The treatment was not removed by rinsings with solutions of soaps or synthetic detergents, but could be removed, if necessary, by mechanical rubbing with a scouring powder.

Analogous results were obtained upon application of organic polymer phosphates of different composition and higher phosphate content such as described in Examples II, XIII, and XV of U.S. 2,723,971, and Example II of U.S. 2,692,876. Such coatings were not removed by rinsing with organic solvents, whereas coatings of these phosphates applied to the glass surface without prior treatment with alumina colloid, were completely and rapidly washed off upon exposure to organic solvents or dilute soap solutions. Multiple coatings could also be applied by alternate applications of alumina colloid and the polymer phosphate.

*Example II.*—Two test squares of cotton drape lining fabric were immersed briefly in a 0.5% dispersion of colloidal alumina prepared as described in (A), padded to remove excess solution, and then dried at 105° C. for about 3 minutes. One of the test samples was then dipped in 4% aqueous solution of the polymer phosphate ammonium salt derived from a copolymer of vinyl acetate and allyl glycidyl ether, copolymerized in a weight ratio of 93 parts vinyl acetate and 7 parts allyl glycidyl ether by the method described in Example XIV of U.S. 2,723,971. This test fabric was then again dried at 105° C. for 3 minutes. Both samples were rinsed in water, followed by four separate and alternate rinsings in 0.1% soap solution and ordinary tap water. The test samples were then placed and agitated for several minutes in a suspension of 0.5% carbon black in 0.05% soap solution. The alumina treated fabric showed severe adsorption of carbon black, while the fabric treated also with the polymer phosphate showed an appreciably lower retention of carbon black. The two test samples were next agitated simultaneously in a 0.1% soap solution. The test fabric coated only with alumina remained dark grey in color, while the fabric having the polymer phosphate coating applied over the alumina was essentially white in color, and had a reflectance within 10% of that of the original unsoiled fabric. This test fabric also showed greatly enhanced dyeability, in comparison to the initial cotton fabric which had no treatments with either alumina or organic polymer phosphate. Organic polymer treatments applied to the cotton fabric without prior treatment with colloidal alumina, were readily removed by single rinsings in water or dilute soap solutions.

*Example III.*—A knit sweater fabric made from "Orlon" (Du Pont acrylic fiber) was scoured to remove finishing oils by boiling for one-half hour in a solution of 1% "Duponol"[1]RA detergent and 1% tetrasodium pyrophos- ---
[1] A Du Pont trademark.

phate, followed by several thorough rinsings in water. The wet fabric was then rinsed briefly in a 1% dispersion of colloidal alumina prepared as described in (A) above and again rinsed thoroughly in water. Without drying, the wet fabric was rinsed and agitated for about 1 minute in a 1% aqueous solution of an organic polymer phosphate ammonium salt, derived from a copolymer of vinyl acetate and allyl glycidyl ether copolymerized at a weight ratio of 93 parts vinyl acetate and 7 parts allyl glycidyl ether, in methyl ethyl ketone solvent and with benzoyl peroxide as the catalyst, using the method described in Example XIV of U.S. 2,723,971. The fabric was again thoroughly rinsed with water, pressed to remove excess water, and dried at 110° C. for about 20 to 30 minutes, until thoroughly dry. Samples of test fabric, used as controls, were given treatments with only alumina or only polymer phosphate, or no treatment except for rinsing in water and drying.

All of the test samples were then rinsed in 0.25% warm soap solution (60° C.) followed by rinsing in lukewarm water. The soap and water rinsing was repeated four times, and the fabric then dried. The dried test fabrics were next dipped into an experimental soiling composition, comprising a mixture of 5 g. Wagg soiling composition mixed into 500 ml. of carbon tetrachloride. The Wagg soiling compound is made up of carbon black and clays mixed with greases, as is described in the Journal of the Textile Institute, vol. 43, T–515–516 (1952). The test fabric treated with both alumina colloid and organic polymer phosphate showed a visibly lower adsorption of the soil than any of the control test samples. All of the test pieces were then dried at room conditions for one hour. The test samples were washed simultaneously, but individually, in 200 ml. of 0.25% soap solution at 140° F. for 20 minutes, using standard experimental washing conditions in the Launderometer. The test fabric treated with both organic polymer phosphate and fibrous alumina colloid was essentially white in appearance, whereas the untreated control and the test sample treated only with alumina both showed severe retention of soil. This difference persisted through several washings, since only the phosphate polymer and alumina treated fabric could be washed cleanly. This outstanding improvement in washability remained effective after several repeated soilings and washing cycles of the test sample treated with both polymer phosphate and alumina. Under similar conditions, the control samples of untreated fabric, or fabric treated with only one of the components showed a gradual increased retention of soil. The fabric coated with both polymer phosphate and alumina also had a softer hand, a brighter appearance and lustre, a lower tendency toward pulling, and showed greatly superior adsorption of dyes in comparison with the controls. Representative data of the whiteness as indicated by the light reflectance values of test fabrics, treated as described above, are summarized below:

| Treatment | Reflectance Value* of Test Fabrics After— | | | | |
|---|---|---|---|---|---|
| | Initial Soiling [1] | Washing twice in 0.25% soap [2] | Resoiling [3] | Washing in 0.25% soap [4] | Washing in 0.25% synthetic Detergent [5] |
| None | 13 | 59 | 10 | 39 | 51 |
| Alumina only | 35 | 63 | 13 | 33 | 49 |
| Alumina+polymer phosphate | 28 | 75 | 27 | 52 | 69 |

*Measured by standard light reflectance procedures with standard white reflectance value=74.
[1] Steps ([1]) to ([5]) carried out consecutively on the same samples under uniformly comparable conditions.

Closely similar results were obtained when other organic polymer phosphates, dissolved in water as the ammonium salts, were used in the above procedures. Typical polymer phosphates are those derived from glycidyl methacrylate homopolymer and copolymers of glycidyl methacrylate with styrene, acrylonitrile, and other vinyl monomers.

A homopolymer of m-styrenephosphonic acid used in the above described procedures was somewhat less effective in improving washability than the organic polymer phosphate described, but better than the untreated or alumina treated controls.

*Example IV.*—Test fabric samples of 100% "Dacron" (Du Pont polyester fiber) which had been scoured to remove finishing oils, were immersed in a 0.75% dispersion of colloidal alumina prepared as described in (A) above warmed to 60° C. for a period of 2 minutes. The test samples were then rinsed thoroughly with water. One of the test samples was next immersed in a solution of organic polymer phosphate derived from a copolymer of vinyl acetate and allyl glycidyl ether copolymerized at a weight ratio of 93 parts vinyl acetate and 7 parts allyl glycidyl ether in methyl ethyl ketone solvent as described in Example III, above. After this treatment, the samples was again thoroughly rinsed with water. An untreated control test sample was rinsed only in water. The three test samples (untreated control, alumina treated, and combination treated) were then rinsed in 0.25% warm soap solution followed by rinsing in water. This soap and water rinsing cycle was repeated four times and, after the final water rinse, the test fabrics were dried at 110° C. for 30 minutes. The test samples were then dipped and agitated for one minute in a soiling composition as described in Example III, above, and dried at room conditions for one hour. The test fabrics were then washed first in 200 ml. of 0.25% soap solution and then in 0.25% synthetic detergent solution as described in Example III. After drying and pressing, the whiteness reflectance values tabulated in column 1 below were measured. The test sample fabrics were again soiled as above, and the reflectance values of the soiled samples measured as recorded in column 2, below. The samples were then washed in 0.25% soap solution under standard washing conditions. After air drying at laboratory conditions, the whiteness reflectance values were as listed in column 3, below. The test samples were then washed in 0.25% synthetic detergent solution and the reflectance values measured as recorded in column 4 below. These data clearly show that coatings of organic polymer phosphate applied over the alumina colloid coating greatly improve the soil resistance and the soil removal of synthetic fabrics. The combination treatment is superior to treatment with only the colloidal alumina. Without the alumina coating the organic polymer phosphates are not retained on the fiber surface, and are removable by simply rinsing in water or dilute soap solution.

| Fabric Treatment | Whiteness Reflect. Val.,[1] 100% "Dacron" test fabric after— | | | |
|---|---|---|---|---|
| | Initial Soiling and Washing | Resoiling | Washing in 0.25% soap | Washing in 0.25% Synthetic Detergent |
| | Col. 1 | Col. 2 | Col. 3 | Col. 4 |
| None | 69 | 19 | 36 | 56 |
| Alumina only | 77 | 30 | 59 | 71 |
| Alumina+polymer phosphate | 78 | 45 | 70 | 76 |

[1] White reflectance standard=74 (pure white).

*Example V.*—Samples of a 65/35, ratio by weight, of "Dacron" Du Pont polyester fiber and cotton fiber were treated by the identical procedures described in Example IV, above. The whiteness reflectance values, measured by standard procedures well known in the art, are tabulated below:

| Fabric Treatment | Whiteness Reflect. Val. of "Dacron" Cotton test fabric after— | | | |
|---|---|---|---|---|
| | Initial Soiling and Washing | Resoiling | Washing in 0.25% soap | Washing in 0.25% Synthetic Detergent |
| | 1 | 2 | 3 | 4 |
| None | 66 | 31 | 48 | 56 |
| Alumina only | 76 | 45 | 65 | 69 |
| Alumina + polymer phosphate | 76 | 47 | 68 | 74 |

[1] White reflectance standard = 74 (pure white).

*Example VI.*—Fabrics made from glass fibers may be treated with polymeric phosphate and alumina in the following manner. The fabric is first desized by washing or solvent extraction, using procedures well known in art. The desized glass fiber fabric is then dipped briefly in a 1% dispersion of coloidal alumina, or colloidal titania, or a similar positively charged metal oxide dispersion. The fabric is rinsed thoroughly with water and then dipped into a dilute solution of an organic polymer phosphate, such as described in Example IV, above. The fabric is next rinsed in water and dried. The drying takes place rapidly, i.e., much faster than the drying under identical conditions of the untreated control or a control treated with only the alumina or the titania aquasol. The treated glass fabric is preferably heated briefly at about 100° C. to 150° C. to cure the treatment. Glass fabrics treated in the above manner with both polymer phosphate and metal oxide colloid, have an agreeable smooth feel and handle; they have excellent flexing and draping quality, excellent dyeability and a desirable water repellency. In all of these properties, they are greatly superior to untreated control samples or those treated with only the metal oxide aquasol.

*Example VII.*—The following example illustrates the application of organic polymer phosphates to paper pulp previously exposed to colloidal alumina in the beater bath and the desirable properties of the product obtained.

One hundred parts of moist kraft paper pulp containing about 50% water was mixed to a uniform pulp suspension in 1000 ml. water. The suspension was divided into four equal parts, and additions made with stirring to each fraction in the following manner:

| Fraction | Addition |
|---|---|
| 1 | 250 ml. of water. |
| 2 | 250 ml. of 0.2% solution of an aqueous solution of the organic polymer phosphate described in Example III, above. |
| 3 | 250 ml. of 0.1% dispersion of colloidal alumina. |
| 4 | 100 ml. of 0.25% dispersion of alumina followed, in 2 minutes, by 150 ml. of a 0.33% solution of the polymer phosphate described in Example III, above. |

All of the pulp suspensions were filtered on a screen and washed thoroughly with water. The pulp prepared from fraction 4, above, filtered faster and gave a smoother sheet of paper than the other treatments listed above. After drying at 100° C. for 1 hour the paper sheet prepared from fraction 4, above, showed good repellency to water and better absorption of dyes than papers made from fractions 1 and 2 listed above. Paper sheets from the fractions 1, 2 and 3, were strongly hydrophilic. Papers made from fractions 1 and 2 were readily redispersed in water, while analogous paper made from fraction 3 was slowly redispersible, and from fraction 4 was difficult to redisperse in water. Paper sheets made from fractions 3 and 4 had superior dry strength to those obtained from fractions 1 and 2. Furthermore, the wet strength of paper sheets made from fraction 4 was superior to similar sheets made from pulp fractions 1, 2 and 3 disclosed above.

Similar results are obtained using cololidal titania and zirconia in place of alumina in the procedure described above. Products made from different polymer phosphates derived from a range of copolymers of vinyl acetate and allyl glycidyl ether, ranging in composition from 95 to 85 parts vinyl acetate and 5 to 15 parts allyl glycidyl ether, employed in step 4 above, give closely the same results when used under similar or identical conditions.

*Example VIII.*—Leather may be improved in its properties and quality by the combined application of metal oxide colloids and the organic polymer phosphates as described in the operation of this invention. In such applications the colloidal metal oxide, preferably fibrous alumina, is first exhausted into the structure of the wet leather goods under slightly acidic conditions. The treated leather is rinsed and then exposed to a dilute aqueous solution of the organic polymer phosphate. Since the alumina is substantive to the leather substrate, it is thoroughly impregnated into the body structure of the leather. The subsequently applied polymer phosphate is likewise substantive to the alumina surface coating, so that it also penetrates smoothly and deeply into the leather structure. After rinsing and application of softening oils and drying, a leather is obtained which has an expanded but firmer body than that of control samples of leather, which are given no treatment or are treated with only one of the two components. The combined polymer phosphate and metal oxide colloid treatment also serves effectively in (1) decreasing dye bleeding, (2) stabilizing and leveling the dye retention, and (3) imparting a fair degree of water repellency to the leather.

*Example IX.*—A cleaned aluminum sheet was coated with a 2% dispersion of colloidal alumina and the excess solution drained from the surface. The surface was dried and heated for 2 minutes at 110° C. to fix the alumina coating. The surface was completely hydrophilic. A 1% solution of the organic polymer phosphate salt described in Example III was then poured over the surface, followed immediately by rinsing with water. The entire surface had now become strongly hydrophobic, although no visible change had occurred. An additional application of alumina colloid again gave a hydrophilic surface and application of another coat of organic polymer phosphate again produced a hydrophobic surface. The treatment was not removed by washing with organic solvents or with soap and detergent solutions, or with dilute acid and aqueous alkali.

*Example X.*—This example compares the effect of several positively charged metal oxide colloids adsorbed on "Orlon" fabric and given an after treatment with an organic polymer phosphate.

A clean, scoured knit "Orlon" sweater fabric is dipped into a 0.5% dispersion of one of the colloidal metal oxides listed below, and the dispersion heated with agitation to 70° C. The dispersion bath is then cooled slowly to about 50° C. and the fabric removed and rinsed thoroughly with water. The fabric is placed in an oven at 100° C. of the ammonium salt of an organic polymer phosphate, prepared by phosphating a copolymer of vinyl acetate and glycidyl ether (93/7 ratio by weight of vinyl acetate/allyl glycidyl ether), as described in Example XIV of U.S. 2,723,971, and the fabric agitated for about 2 minutes to insure good impregnation. The fabric is then rinsed with water and again left in an oven at 110° C. for about 20 minutes, until dry. Various tests are then carried out on the test fabrics to compare their properties with an untreated control fabric; the results are tabulated below. The washability tests were carried out by soiling the fabric with Wagg soiling compound and washing first with Ivory soap and then with "Tide" synthetic detergent, as described in Example III, above.

| No. | Metal Oxide Sol (positively charged) | Av. Part. Size, mu | Sol available from— |
|---|---|---|---|
| 1 | "Alon" C | 25 | Commercial from Godfrey L. Cabot, Inc., Cambridge, Mass. |
| 2 | Zirconia | 30 | Prepared by method of copending pat. appln. S.N. 784,641 filed Jan. 2, 1959. |
| 3 | Titania | 10 | Prepared by hydrolysis of titanium sulfate by the method of U.S. Reissue 16,956. |
| 4 | Iron Oxide | 20 | Grade C-7, commercial from Godfrey L. Cabot, Inc., Cambridge, Mass. |
| 5 | Tin Oxide | 10 | Prepared by procedure described in "Laboratory Manual of Colloid Chemistry," by H. N. Holmes, 2nd ed., p. 37, exp. 40, published by John Wiley and Sons, Inc., N.Y. |
| 6 | Chromium oxide | 10 | Prepared by method ibid, p. 35, Exp. 34. |
| 7 | Control (no treatment) | | |

*Test Results*

[Numbers refer to above tabulation]

| No. | Color of Treated Fabric | Hand of Fabric [1] | | Washability [2] (of Phosphate Polymer Treated Fabric) |
|---|---|---|---|---|
| | | Before Phosph. Application | After Phosph. Application | |
| 1 | White | Sl. harsh | Good | Excellent. |
| 2 | do | Good | Excellent | Do. |
| 3 | do | do | do | Do. |
| 4 | Greenish tint | do | do | Do. |
| 5 | Yellow-brown | Excellent | do | Do. |
| 6 | White | Harsh | do | Do. |
| 7 | do | Good | Good | Fair. |

[1] Comparing softness or harshness with control rated as good.
[2] Completely clean fabrics rated "excellent" are the same in appearance as unwashed controls after washing. The "fair" rating for the washed control represents a slight grey color caused by retained soil.

*Example XI.*—This example illustrates the exhaustion of zirconia and titania colloids on "Orlon" knit sweater fabric followed by the application of an organic polymer phosphate to give improvement in washability.

Knit sweater test fabric made of "Orlon" (a Du Pont trademark for its acrylic fiber) is scoured as described in Example III above. Test samples of the fabric are then dipped in (1) a 1% dispersion of colloidal zirconium oxide and (2) in a 1% dispersion of colloidal titanium oxide. The zirconia sol is made by heating zirconium oxychloride in water and partially deionizing the aquasol thus obtained by treatment with basic ion exchange resin in accordance with the teachings of U.S. application Serial No. 625,188, now Patent No. 2,948,628. The titania sol is made by hydrolyzing titanium sulfate in water, precipitating the oxide by neutralizing the sol to pH 7.0, removing the sulfate ions from the filter cake by repeated washings with water and then repeptizing the titania by the addition of hydrochloric acid to give a pH 1.30. The positively charged titania sol obtained in this manner had 20% titanium oxide solids by weight.

The fabrics after brief immersion in the metal oxide aquasols are rinsed thoroughly with water, and then dipped in a 1% aqueous solution of the ammonium salt of an organic polymer phosphate derived from the copolymer of vinyl acetate and allyl glycidyl ether (93/7 weight ratio) as described by the procedure of Example 14 of U.S. 2,723,971. The test fabrics are again rinsed thoroughly in water and then dried at 110° C. for 30 minutes.

The test fabrics are rinsed alternately in 0.25% of soap solution at 60° C. and with tap water, repeating these rinsings four times consecutively. After the final rinsing the fabrics are dried (110° C./30 min.) and soiled as described in Example III above. The reflectance readings are obtained on the soiled samples are listed in col. 1 of the tabulation below. After washing in soap solution and then in "Tide" synthetic detergent as described in Example III above, the reflectance values listed in Col. 2 were obtained. The samples are then again soiled in the standard soil composition and reflectance values measured as shown in Col. 3 below. After again washing twice as before, the reflectance values listed in Col. 4 were obtained.

REFLECTANCE VALUES OF "ORLON" KNIT SWEATER TEST FABRIC

| Fabric Treatment | Col. 1 | Col. 2 | Col. 3 | Col. 4 |
|---|---|---|---|---|
| | Soiled | Washed | 2nd soiling | 2nd washing |
| None | 40 | 69 | 17 | 53 |
| alumina only | 37 | 59 | 17 | 51 |
| zirconia only | 25 | 59 | 16 | 52 |
| zirconia + polymer phosphate | 22 | 78 | 14 | 64 |
| titania only | 21 | 46 | 18 | 43 |
| titania + polymer phosphate | 24 | 78 | 13 | 59 |

The high reflectance values of the test fabrics treated with the organic polymer phosphate, in addition to the initial metal oxide treatment, demonstrates the value of the organic phosphate coating in promoting the ease of soil removal. This combination treatment is especially valuable and practical in promoting the washability and case of laundering white sweaters. Moreover, such treated sweaters have a softer, smoother hand and a greatly reduced tendency toward surface pilling.

*Example XII.*—A paper pulp suspension is prepared as described in Example VII above and to this suspension is added, as described in step 4 of this example, 100 ml. of a 0.25% dispersion of fibrous colloidal alumina and the composition stirred for 2 minutes. To the composition is then added 150 ml. of a 0.33% solution of the ammonium salt of a polyalkylene phenyl phosphinic acid polymer made by reacting polyethylene with phenyl phosphorus dichloride and oxygen as described in Example 1 of U.S. Patent No. 2,829,137. The pulp suspension thus obtained filtered much faster and gave a smoother paper sheet, than sheets made from the same pulp sample given no treatment or treated only with the same amount of colloidal alumina. When dried the paper treated with both alumina and the polyalkylene phenyl phosphonic acid polymer is highly repellent to water while the untreated control, or controls treated with only alumina or only the polyalkylene phosphinic acid, are all strongly hydrophilic in character. The tensile strength both dry and wet, and the bursting strength of these controls are also inferior to the paper treated with both alumina colloid and the phosphinic acid polymer.

Similar results are obtainable when the polyalkylene phenyl phosphonic acid polymer is replaced in the above procedures by polyethylene phosphinic acid, having recurring groups of the following structure in the polymer chain:

$$-CH_2-CH- \\ \phantom{-CH_2-}| \\ \phantom{-CH_2-}H-P=O \\ \phantom{-CH_2-H-}| \\ \phantom{-CH_2-H-}OH$$

prepared by reacting a low molecular weight polyethylene with phosphorus trichloride and oxygen by the general procedure described in J. Am. Chem. Soc., vol. 71, p. 2384 (1949). However, the water repellency obtained from this product, used in combination with the same fibrous colloidal alumina, is somewhat lower than that obtained from the phosphinic polymer made from the same polyethylene reacted with phenylphosphorus dichloride as described above.

*Example XIII.*—A porous ceramic tile is dipped into an aqueous dispersion containing 0.5% fibrous boehmite alumina colloid and immediately withdrawn from the solution. The solution adhering to the surface is readily absorbed into the tile. The tile is then dipped momentarily in an aqueous solution containing 1% of the ammonium salt of the polyethylene phenyl phosphinic acid, prepared as described in Example 1 of U.S. 2,829,137, and gain withdrawn. The solution covering the surface is quite readily absorbed by the tile. The treated tile is then rinsed with water. The surface is moderately repellent to water. On air drying for one hour or longer, the surface of the tile is no longer moist and then shows a strong water repellency. This water repellency is not removable by repeated rinsings under a stream of water. The untreated control tile, or a tile treated in similar manner with only alumina or only the phosphinic acid polymer, has essentially no repellency to water.

Bricks dipped momentarily in dilute dispersions of alumina colloid, rinsed with water, and then dipped in dilute solutions of polyethylene phosphinic acid polymer are, likewise, made repellent to water. The treatment is permanent to repeated exposure to rain and does not require curing by heating in order to be permanently effective.

*Example XIV.*—A knit sweater fabric made of "Orlon" (acrylic fiber—Du Pont) is scoured with mild agitation for 20 minutes in 50 parts by weight, based on fabric weight, of deionized water warmed to 90° C. and containing 0.2% "Duponol" RA and 0.2% tetrasodium pyrophosphate. The scouring solution is slowly cooled, during 5 to 10 min., to about 50° C. and the fabric is then rinsed with deionized water until free of detergent, and squeezed to remove most of the water. The moist, scoured fabric is then cut into test pieces of about 10" x 10" each. Three of these test pieces are treated as follows:

| No. | 1st step | 2nd step | 3rd step | 4th step |
|---|---|---|---|---|
| 1 | Dip in water only (control). | rinsed | immersed in water | rinsed. |
| 2 | Dip in 400 ml. of 1% dispersion of "Alon" C. | do | do | Do. |
| 3 | do | do | immersed in 400 ml. of 1% solution of phosphate polymer. | Do. |

The "Alon" C dispersion used in step 1, above, is made by mixing 4 parts by weight of "Alon" C dry powder (colloidal alumina supplied by Godfrey Cabot Co.) with 396 parts by weight of water. The rinsing is done by immersing and agitating the fabric in six changes of ordinary tap water of 600 ml. each. The phosphate polymer used in step 3, for treating fabric No. 3, above, is the ammonium salt of the phosphated vinyl acetate/allyl glycidyl ether copolymer (ratio 93 parts vinyl acetate/7 parts allyl glycidyl ether) prepared by the procedure described in Example XIV of U.S. 2,723,971.

The fabrics after the final rinsing are dried at 110° C. for 30 min. To compare the resistance to laundering and improvement in washability characteristics, the fabrics are then treated as described below.

The individual test samples are agitated and squeezed by hand for about one-half minute in a warm 0.25% solution of Ivory soap flakes and then rinsed with warm tap water. This soaping and rinsing cycle is repeated four times for each fabric, using uniform conditions. After the last rinsing, the fabrics are again dried at 110° C. for 30 min. The test samples are then immersed, simultaneously, in a solution of 5.0 gm. Wagg soiling compound (J. Text. Inst. 43, T515 (1952)), dispersed in 500 ml. carbon tetrachloride. After drying for one-half hour, the test samples are washed individually for 20 min. in jars containing 200 ml. of 0.25% Ivory soap solution, placed in a Launderometer heated at 140° F. This washing cycle is then repeated in the same manner, using a fresh soap solution. After the second washing the untreated (No. 1) control had a light gray discoloration, while the other samples (Nos. 2 and 3) are essentially white and clean in appearance. The samples are dried, again soiled by the procedures described above, and again washed twice in the Launderometer by the method given above. Measurements are then made of the reflectance of light from these samples, using a Photovolt reflectometer giving a standard white reflectance value of 74. The values obtained are listed below:

| Sample No. | Treatment | Reflectance Value |
|---|---|---|
| 1 | None—Control | 63 |
| 2 | "Alon" C only | 65.5 |
| 3 | "Alon" C+phosphate polymer | 71 |

The improvement in washability of the polymer coated "Alon" C treatment is demonstrated by the high reflectance value obtained. This test sample has a clean, pure white appearance, while the fabric treated only with "Alon" C shows a "tattletale" gray discoloration, and the untreated control has a definitely objectionable gray color.

*Example XV.*—A knit fabric of "Orlon" (Du Pont trademark) acrylic fiber is treated by dipping in a water dispersion of Alon C alumina (5 percent by weight of fabric) for twenty minutes at 140° F. Alon C is a trademark of Godfrey L. Cabot Co. for its colloidal alumina having a particle size range of from about 0.01 to 0.04 micron. The treated fabric is next dipped into a water solution of a polymer phosphate derived from the copolymer of vinyl acetate and allyl glycidyl ether phosphate (Example XIV of U.S. 2,723,971) containing a ratio of vinyl acetate to allyl glycidyl ether of 93:7. The treated fabric is left in this solution for ten minutes at room temperature, rinsed, dried, scoured in a mixture of one percent trisodium phosphate plus one percent of the sodium salt of the sulfate of the condensation product of ethylene oxide and oleyl alcohol and finally dried.

The fabric is then characterized for pilling in a laboratory random tumble pilling tester using a control fabric without Alon C and without a topcoat as a comparison. Results are as follows for a twenty-minute test: The control has a rating of 2.0; the Alon C plus a topcoat has a rating of 1.8, indicating an improvement in resistance to pilling of the fabric surface.

*Example XVI.*—A series of identical sweater fabrics were knitted from yarn spun from acrylic staple fiber (a terpolymer of 94% acrylonitrile, 5% methyl acrylate and 1% sodium styrene sulfonate). Each of these fabrics was scoured and treated with fibrous boehmite prepared as in A, above (BF) using the same procedure as described in Example III. Polymeric phosphates were then applied on top of the boehmite as described in Example III. Following the procedure given in Example III two different copolymers were prepared by varying the weight ratios of the two monomeric ingredients; one polymer was composed of 93 parts vinyl acetate (VAC) and 7 parts allyl glycidyl ether (AGE), and another of 85 parts VAC and 15 parts AGE. Samples of each was dissolved in dilute NaOH solution at 10% polymeric concentration. Excess NaOH was added to give the solution a pH of about 10.5. The solution was then held at 80° C. for 6 hours during which time a portion of the acetate groups were hydrolyzed without hydrolysis of the phosphate groups. Six different samples of knitted fabrics were tested in the random tumble pilling tester for 20 minutes and the pilling propensity of each fabric reported in the table below. One of the sample fabrics was a control sweater having neither boehmite F coating nor polymer topcoat and a second sample was treated with boehmite F but had no polymer topcoat.

| Fabric Treated | Pill Rating |
| --- | --- |
| 1. Control | 3.5 |
| 2. BF alone | 2.3 |
| 3. BF+85% VAC/15% AGE | 1.6 |
| 4. BF+85% VAC/15% AFE (hydrolyzed) | 1.7 |
| 5. BF+93% VAC/7% AGE | 2.0 |
| 6. BF+93% VAC/7% AGE (hydrolyzed) | 2.1 |

These results clearly show that the polymeric phosphate topcoatings reduce the pilling of the fabric over and above the reduction in pilling obtained by using boehmite F alone.

The claims are:

1. A substrate bearing a basecoat of water-insoluble positively charged colloidal metal oxide particles in the amount of from 0.1 to 5% by weight based on the substrate, said particles having largest average diameters of less than about 1 micron and having an average specific surface area of at least 10 square meters per gram and said oxide being an oxide of a metal selected from the group consisting of aluminum, zirconium, titanium, chromium, iron and tin, and a topcoat of anionic organic polymer containing pentavalent phosphorus, said organic polymer having a molecular weight of at least 500 and having at least ½ weight percent of pentavalent phosphorus, and said substrate being negatively charged with respect to the colloidal metal oxide particles.

2. The product of claim 1 wherein the metal oxide is fibrous boehmite.

3. The product of claim 1 wherein the substrate is a resin of the type of synthetic linear polycarbonamides.

4. The product of claim 1 wherein the substrate is a fibrous polyethylene terephthalate.

5. The product of claim 3 wherein the substrate is fibrous polyacrylonitrile.

References Cited in the file of this patent

UNITED STATES PATENTS

| | | |
| --- | --- | --- |
| 2,323,387 | Edelstein | July 6, 1943 |
| 2,915,475 | Bugosh | Dec. 1, 1959 |